Apr. 24, 1923.

L. M. BICKETT 1,453,123

MOLD FOR RUBBER MATS, ETC

Filed June 23, 1922

INVENTOR.
Leroy M. Bickett
BY
Erwin Wheeler & Woolard
ATTORNEYS.

Patented Apr. 24, 1923.

1,453,123

UNITED STATES PATENT OFFICE.

LEROY M. BICKETT, OF WATERTOWN, WISCONSIN.

MOLD FOR RUBBER MATS, ETC.

Application filed June 23, 1922. Serial No. 570,322.

*To all whom it may concern:*

Be it known that I, LEROY M. BICKETT, a citizen of the United States, residing at Watertown, county of Jefferson, and State of Wisconsin, have invented new and useful Improvements in Molds for Rubber Mats, Etc., of which the following is a specification.

This invention relates to improvements in molds for rubber mats, sheets, and other articles made from rubber.

Heretofore such molds have been made of rubber in the form of a mat or sheet having a figured upper surface, which was the counterpart of the configuration desired to be produced on the surface of the article to be manufactured. These rubber molds sometimes were provided with a backing of canvas, and were vulcanized to a desired extent. Then by spreading raw rubber over the upper surface of such a mold and placing the mold in a press, the raw rubber could be forced into conformity with the configuration of the mold and simultaneously heated to vulcanize it to the desired extent. Thereupon the press platen could be retracted and the contoured article removed from the mold and trimmed along its margins to the desired size.

It has been found, however, that molds made as above described are progressively distorted whenever they are subjected to pressure in the press. Such distortion sometimes consists merely in expansion. At other times, due to the unequal expansion, the shape and configuration are changed, even the surface configuration distant from the margin being frequently altered to such an extent as to impair the attractiveness of the design. For these reasons the molds heretofore made are serviceable for only a few operations, whereupon they must be discarded and new molds substituted, thereby entailing large expense and also causing serious loss by reason of the production of inferior or second grade mats.

The object of my invention is to provide means whereby a mold of the described type may be made, which will not expand or become distorted by continued use, thereby prolonging the life of the mold and enabling the manufacturer to produce mats or other articles of uniform quality and exact and unvarying design and size.

In the drawings.

Like parts are identified by the same reference characters throughout the several views.

Figure 3:
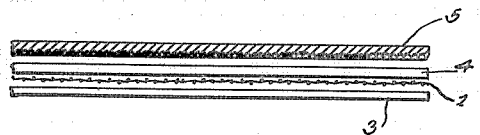
Figure 3 is a side view showing fragments of the mold separated vertically from each other to clearly expose the elements composing the mold.
Figure 4:
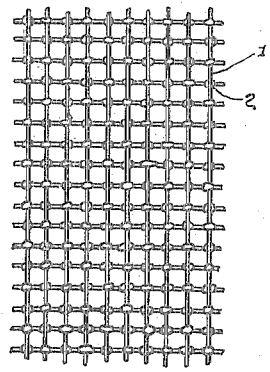
Figure 4 is a detail view showing a portion of the re-enforcing element or metallic net.
Figure 5:
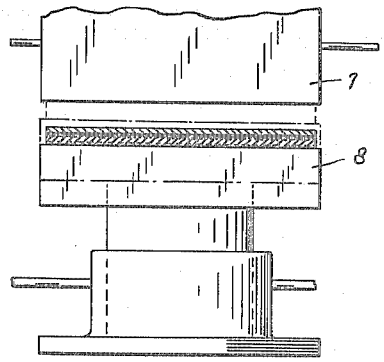
Figure 5 is an elevation showing the working elements of a press as it appears in a mat-forming operation, the mold and the completed mat being shown in section.
Figure 6:
Figure 6 is a fragmentary sectional view showing a portion of a completed mat as it appears preparatory to its removal from the mold.

In the manufacture of my improved mold, I first prepare a foraminous metallic element, such for example as the woven or crossed wire net 1 illustrated in Figure 4. I preferably stiffen this net by soldering or welding the wires together at the crossing points, as indicated at 2 in Figure 4. I then take a sheet 3 of raw rubber (Figure 3) and place this re-enforced or rigid foraminous element thereon, after which, I cover it with another sheet of raw or partially vulcanized rubber 4. Then by means of a suitable die or pattern plate 5 I impress the desired surface configuration in the sheet 4, this operation being preferably done in the press illustrated in Figure 5, in which superposed elements are placed between the upper and lower platens or press plates 7 and 8, whereby the pattern plate or die 5 may have its ridges and other projections forced into the material composing the element 4, and said element 4 may be simultaneously pressed upon the element 1 with sufficient pressure to cause the rubber in the elements 3 and 4 to pass through the openings in the element 1 and meet or mingle. The press platens 7 and 8 are heated in accordance with the practice common in this art, these platens being made hollow for the admission of steam. Therefore, the rubber elements 3 and 4 of the mold are vulcanized during the compressing operation and are united to each other with the net 1 embedded therein, i. e., in the rubber of the two elements 3 and 4.

Figure 1:
Figure 1 is a sectional view of a portion of one of my improved molds.
Figure 2:
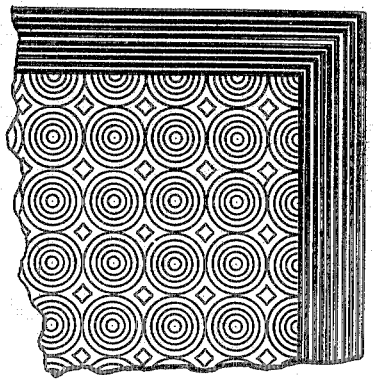
Figure 2 is a fragmentary plan view.

If desired, the element 3 may be made very thin, whereby when the pressing or mold-forming operation is completed, the element 1 will be substantially at the bottom of the mold, as shown in Figure 1. In fact, it is possible to omit the element 3 entirely, although I preferably use it in order to wholly embed the metal element and thereby not only conceal it, but more securely anchor it in the body of the mold.

When the press platens are retracted from each other, the pattern form 5 may be removed and the mold is then ready for use, either with or without marginal trimming.

The mold may then be used in the ordinary manner for shaping and vulcanizing mats or other articles, in the manufacture of which raw rubber is placed or spread over the upper surface of the mold and compressed or vulcanized between the press platens 7 and 8.

It has been found in practise that by employing a foraminous element or net 1, which will not distort or expand under pressure exerted by the press platens, the mold can be used for long periods of time without material distortion, and each mat or rubber article produced will be exactly like all of the others produced in that mold.

I claim:

1. A mold for rubber sheets and mats comprising a plate having base and top portions composed of yielding material, and an embedded foraminous portion composed of a material which will not expand or distort laterally under vertical pressures.

2. A mold for rubber sheets and mats comprising base and top portions of yielding material, and an embedded net of crossed wires rigidly connected with each other at the joints.

3. A mold for rubber sheets and mats comprising a sheet of rubber having a foraminous metal backing, and having its opposite surface figured.

4. A mold for rubber articles comprising a vulcanized sheet of rubber having one surface figured, and the other surface provided with a foraminous metal backing.

5. A mold for rubber articles comprising a vulcanized sheet of rubber having one surface figured, and the other surface provided with a foraminous metal backing, said metal back being anchored to the rubber sheet by portions of rubber engaged in the openings of the metal element.

LEROY M. BICKETT.